(12) United States Patent
Emmerling

(10) Patent No.: US 11,117,550 B2
(45) Date of Patent: Sep. 14, 2021

(54) ENTRY AND STARTING SYSTEM AND METHOD FOR ENTRY AND STARTING VERIFICATION

(71) Applicant: Continental Automotive GmbH, Hannover (DE)

(72) Inventor: Ulrich Emmerling, Munich (DE)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/954,279

(22) PCT Filed: Dec. 19, 2018

(86) PCT No.: PCT/EP2018/085936
§ 371 (c)(1),
(2) Date: Jun. 16, 2020

(87) PCT Pub. No.: WO2019/121978
PCT Pub. Date: Jun. 27, 2019

(65) Prior Publication Data
US 2021/0139002 A1  May 13, 2021

(30) Foreign Application Priority Data
Dec. 20, 2017 (DE) ..................... 10 2017 223 423.7

(51) Int. Cl.
*B60R 25/24* (2013.01)
*G07C 9/00* (2020.01)
*B60R 25/20* (2013.01)

(52) U.S. Cl.
CPC ............ *B60R 25/24* (2013.01); *B60R 25/209* (2013.01); *G07C 9/00309* (2013.01);
(Continued)

(58) Field of Classification Search
CPC ... B60R 25/24; B60R 25/209; G07C 9/00309; G07C 2009/0038; G07C 2009/00555; G07C 2009/0096; G07C 2209/63
See application file for complete search history.

(56) References Cited

U.S. PATENT DOCUMENTS 7,446,644 B2 * 11/2008 Schaffzin ........... G07C 9/00182
340/5.6
9,002,540 B2 * 4/2015 Ledendecker .......... B60R 25/24
701/2
(Continued)

FOREIGN PATENT DOCUMENTS

DE        19927253 A1    1/2001
DE     102011050160 A1   11/2012
(Continued)

OTHER PUBLICATIONS

International Search Report and Written Opinion, for International Application No. PCT/EP2018/085936, dated Apr. 12, 2019, with partial translation, 7 pages.
(Continued)

*Primary Examiner* — Thomas D Alunkal
(74) *Attorney, Agent, or Firm* — RatnerPrestia

(57) ABSTRACT

An entry system includes a transponder unit and a transmission unit which is arranged in an object. The transmission unit is designed to transmit a request to the transponder unit, and the transponder unit includes a motion sensor which is designed to detect a movement of the transponder unit and to generate motion information. The transponder unit is designed to transmit, in a first operating state, to the transmission unit, in response to the request, a reply containing the motion information, wherein the transmission unit is designed to decide on the basis of the motion information whether to activate the object.

10 Claims, 3 Drawing Sheets

(52) U.S. Cl.
CPC ............... *G07C 2009/0038* (2013.01); *G07C 2009/0096* (2013.01); *G07C 2009/00555* (2013.01); *G07C 2209/63* (2013.01)

(56) References Cited

U.S. PATENT DOCUMENTS

| | | | | |
|---|---|---|---|---|
| 9,208,306 | B2* | 12/2015 | Davis | G06K 19/0716 |
| 2014/0253287 | A1* | 9/2014 | Bauman | B60R 25/00 |
| | | | | 340/5.61 |
| 2015/0302673 | A1* | 10/2015 | Seiberts | G07C 9/30 |
| | | | | 340/5.61 |
| 2016/0075307 | A1* | 3/2016 | Jakobsson | G07C 9/00309 |
| | | | | 701/2 |

FOREIGN PATENT DOCUMENTS

| | | |
|---|---|---|
| DE | 102011116157 A1 | 4/2013 |
| DE | 102016220126 A1 | 5/2017 |
| DE | 102015223342 A1 | 6/2017 |
| EP | 2612795 A1 | 7/2013 |
| GB | 235117 A | 12/2000 |
| WO | 2013072489 A1 | 5/2013 |
| WO | 2018145876 A1 | 8/2018 |

OTHER PUBLICATIONS

International Search Report and Written Opinion for International Application No. PCT/EP2018/085936, dated Apr. 12, 2019, 13 pages (German).

German Examination Report for German Application No. 10 2017 223 423.7, dated Aug. 10, 2018, 7 pages.

\* cited by examiner

ENTRY AND STARTING SYSTEM AND METHOD FOR ENTRY AND STARTING VERIFICATION

CROSS REFERENCE TO RELATED APPLICATIONS

This application is the U.S. National Phase Application of PCT International Application No. PCT/EP2018/085936, filed Dec. 19, 2018, which claims priority to German Patent Application No. 10 2017 223 423.7, filed Dec. 20, 2017, the contents of such applications being incorporated by reference herein.

FIELD OF THE INVENTION

The invention relates to an entry system and to a method for entry verification, in particular for entry verification in a vehicle.

BACKGROUND OF THE INVENTION

Keyless vehicle entry and starting systems such as the Passive Start Entry (PASE) system, for example, are automatic systems for unlocking a vehicle without active use of an automobile key and for starting said vehicle just by actuating the start button. A transmission unit that emits signals at regular intervals is in this case arranged in the vehicle. These are, for example, electromagnetic signals in the LF (Low Frequency) or HF (High Frequency) band. These signals are received by a transponder unit when it is located in the vicinity of the vehicle, and are subsequently evaluated and/or processed further by the transponder unit. Following the evaluation and/or further processing in the transponder unit, corresponding response signals can be sent back again to the transmission unit in the vehicle. The response signals are transmitted in the UHF frequency band, for example, and can be evaluated in the vehicle by an evaluation unit. If a response signal is recognized as being correct and hence the transponder unit is recognized as belonging to the vehicle, the vehicle can be unlocked or started. Other functions in the vehicle can also be controlled in this manner.

Such systems are however able to be attacked relatively easily, for example by way of what are known as relay attacks. In addition, the power consumption in the vehicle is high, since the signals have to be emitted from the vehicle at regular intervals, even if there is possibly no authorized transponder unit located in the vicinity of the vehicle for a prolonged period. The power consumption of the transponder unit is also high, since the transponder unit always has to be ready to receive and evaluate signals from a vehicle.

SUMMARY OF THE INVENTION

An aspect of the invention is an improved entry system and an improved method for entry verification that better protect a vehicle or another object against unwanted attacks by third parties and in which the power consumption is reduced in the transponder unit.

An entry system comprises a transponder unit and a transmission unit which is arranged in an object. The transmission unit is designed to transmit a request to the transponder unit, and the transponder unit comprises a motion sensor which is designed to detect a movement of the transponder unit and to generate motion information. The transponder unit is designed to transmit, in a first operating state, to the transmission unit, in response to the request, a reply containing the motion information, wherein the transmission unit is designed to decide on the basis of the motion information whether to activate the object.

An entry system of this type is better protected against attacks by third parties, for instance attacks known as relay attacks. If an object is meant to be unlocked, for example, a transponder unit carried by the user normally moves towards the object. This means that movement of the transponder unit is detected.

The transmission unit can therefore also be designed to activate the object if the transmission unit recognizes from the motion information that the transponder unit has been moved within a predefined first time interval prior to transmission of the request.

The transponder unit can also be designed to transmit to the transmission unit a notification that the transponder unit will transition into a second operating state within a predefined second time interval after transmission of the notification.

The second operating state may be an idle state, for instance. In the second operating state, various components of the transponder unit may be disabled, for instance. This reduces the power consumption of the transponder unit. If, in the second operating state, for example a transceiver unit of the transponder unit is deactivated, the transponder unit can no longer receive any requests from the transmission unit and also can no longer emit any replies. This also better protects the entry system against attacks by third parties.

The transmission unit can also be designed to decide on the basis of at least one specified state transition criterion, after receiving the notification, whether to transmit to the transponder unit an instruction that causes the transponder unit to remain in the first operating state within and beyond the predefined second time interval after transmission of the notification.

Activating the object can comprise at least one of the following activities: unlocking the object, locking the object, giving the object clearance to start, and switching on the object.

The transmission unit and the transponder unit can additionally be designed to transfer the request, the reply, the notification and the instruction in signed or encrypted form.

This means that unauthorized third parties are unable to intercept or tamper with the sent messages. The security of the entry system is thereby increased even further. The transmission unit can be designed to decide on the basis of the motion information and at least one specified activation criterion whether to activate the object.

The at least one specified activation criterion is selected from a group consisting of: locking state of the object, operating state of the object, and position of the transponder unit relative to the object.

The transponder unit can be arranged in one of the following portable devices: vehicle key, smartphone, tablet or laptop.

Such portable devices are increasingly performing the function of electronic keys. This reduces the number of devices that a user has to carry.

A method comprises transmitting a request to a transponder unit, and detecting movements of the transponder unit by means of a motion sensor, and generating motion information. After the request is received, a reply containing the motion information can be transmitted from the transponder unit to the transmission unit. The transmission unit decides on the basis of the motion information whether to activate the object, wherein the transmission of the reply takes place in a first operating state of the transponder unit and in response to the request.

A vehicle comprises an entry system, wherein the entry system comprises a transponder unit and a transmission unit which is arranged in an object. The transmission unit is designed to transmit a request to the transponder unit, and the transponder unit comprises a motion sensor which is designed to detect a movement of the transponder unit and to generate motion information. The transponder unit is designed to transmit, in a first operating state, to the transmission unit, in response to the request, a reply containing the motion information, wherein the transmission unit is designed to decide on the basis of the motion information whether to activate the object.

BRIEF DESCRIPTION OF THE DRAWINGS

An aspect of the invention is explained in more detail below with reference to figures, where identical or similar elements are provided with the same reference signs.

DETAILED DESCRIPTION OF THE PREFERRED EMBODIMENTS

Figure 1:
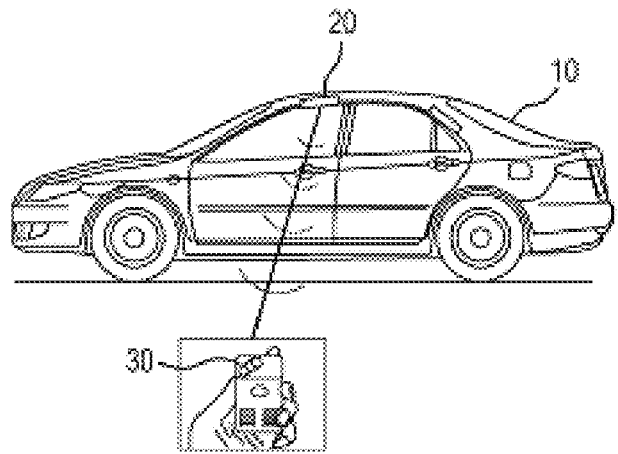
FIG. 1 uses a sketch to illustrate the principle of a keyless vehicle entry system.

FIG. 1 shows a schematic diagram of the operating principle of a keyless vehicle entry system. In the vehicle 10 is arranged a transmission unit 20, which can comprise an evaluation unit and a receiving unit, and which is designed to emit signals, for instance electromagnetic signals in the LF (low frequency) or HF (high frequency) band. These signals can be received by a transponder unit 30 when the latter is located in the vicinity of the vehicle 10, and can subsequently be evaluated and/or processed further by the transponder unit 30. Following the evaluation and/or further processing in the transponder unit 30, a corresponding reply (reply message) can be sent back to the transmission unit 20 in response to a request by the transmission unit 20. The reply is transmitted in the UHF frequency band, for example, and can be evaluated in the vehicle 10 by the transmission unit 20. The transponder unit 30 may be arranged, for example, in an electronic vehicle key, which can be carried by the driver of the vehicle 10.

In order to receive the signals sent by the transmission unit 20, the transponder unit 30 must be located within a particular radius around the vehicle 10, since signals in the LF and HF bands have only a limited range. This radius may lie between 5 meters and 10 meters, for example. This is just an example, however. The range can also be larger or smaller. The transponder unit 30 can send the reply to the transmission unit 20 in the vehicle 10 over a greater distance if the reply has been transmitted in the UHF frequency band, since this has a greater range.

The transmission unit 20 can emit signals continuously (at regular intervals). This ensures that the transponder unit 30, if it is approaching the vehicle 10, is recognized in good time, with the result that the authentication can be completed and the vehicle 10 can be unlocked before a user opens one of the vehicle doors. The vehicle 10 is unlocked, for instance, when the transponder unit 30 sends back a correct reply to a request emitted by the transmission unit 20 and received by the transponder unit 30.

The repeated emission of requests by the transmission unit 20, however, places a load on the vehicle battery. Energy is required to generate the electromagnetic signals. The vehicle battery may thereby become severely discharged, in particular during long stationary periods.

A severe load may also be placed on the battery of the transponder unit 30 because the transponder unit 30 must be constantly in an active state (what is often referred to as listening mode) in order to be able to receive and process signals emitted by the transmission unit 20 of the vehicle 10 at all times.

In addition, such systems may be attacked relatively easily, for example by way of what are known as relay attacks. In this process, two devices, one of which is located in the vicinity of the vehicle 10 and the other of which is located in the vicinity of the transponder unit 30, can be used to span a greater distance between the vehicle 10 and the transponder unit 30 by extending the radio link of the communication channel being used. It is thereby possible to open and start a vehicle 10 even though the vehicle key (comprising the transponder unit 30) is not located within the range needed for the transponder unit 30 to communicate directly with the transmission unit 20.

Figure 2:
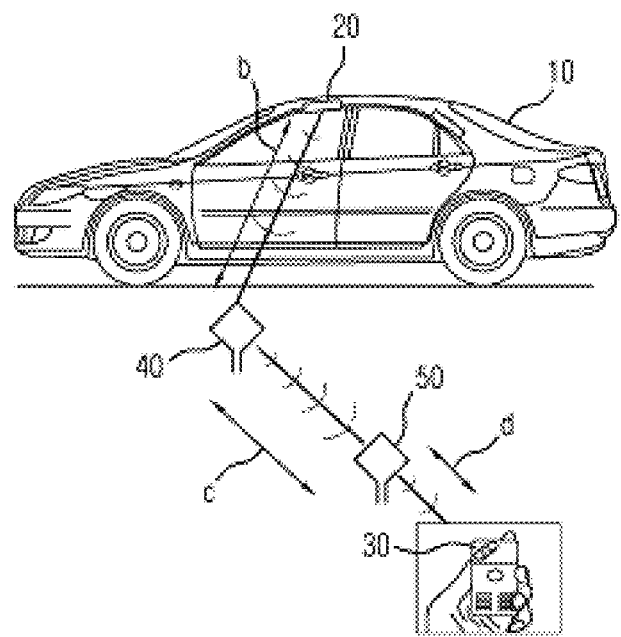
FIG. 2 uses a sketch to illustrate the principle of an attack on a keyless vehicle entry system.

FIG. 2 shows a schematic diagram of the principle of such a relay attack on a keyless vehicle entry system by means of extending the radio link of a communication channel. In the diagram shown in FIG. 2, the transponder unit 30 is located outside the range of the request sent by the transmission unit 20. Within the radius needed for direct communication between the transponder unit 30 and transmission unit 20, however, is located a first device 40, which has an antenna, in the vicinity of the vehicle 10. The distance between the first device 40 and the transmission unit 20 in the vehicle 10 is denoted by b in FIG. 2. A second device 50, which likewise has an antenna, is arranged within the range of the transponder unit 30. In FIG. 2, the distance between the second device 50 and the first device 40 is denoted by c, and the distance between the second device 50 and the transponder unit 30 is denoted by d.

In the example shown, the first device 40 in the vicinity of the vehicle 10 receives signals emitted by the transmission unit 20, and relays these signals to the second device 50. The signal is in turn sent from the second device 50 to the transponder unit 30. Amplifiers and transmission stages, for example, are needed in the devices 40, 50 in order to be able to transmit the signals over a distance c between the first and second devices 40, 50, which may be significantly greater than the normal range of the signals used for the communication between the transponder unit 30 and the transmission unit 20. Thus this arrangement allows communication to take place between the vehicle 10 comprising the transmission unit and the key comprising the transponder unit 30 over a far greater distance than would be possible for communication without the involvement of the devices 30, 40 acting as a relay.

In the example shown, the signal is received, evaluated and/or processed by the transponder unit 30. The reply emitted thereupon by the transponder unit 30 may be transmitted back to the vehicle 10 again via the same arrangement comprising the first and second devices 40, 50. The evaluation electronics arranged in the vehicle 10 may therefore not detect initially that the key is not located within the range. Although the key is not within the range, the vehicle 10 may therefore still be opened.

Without an aforementioned arrangement being used to extend the range, it would still be possible, for instance, to open and start a vehicle 10 without authorization when the key comprising the transponder unit 30 is located within the range required for direct communication between the transponder unit 30 and the transmission unit 20 but the authorized user does not want to start the vehicle 10 at all. For example, this may be the case when the vehicle 10 is sitting in front of a user's house and the key comprising the transponder unit 30 is located in the house at a location that is within the range.

Figure 3:
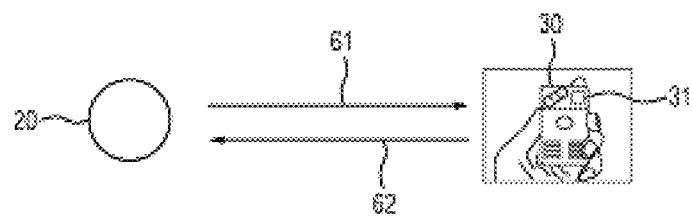
FIGS. 3-5 use function diagrams to illustrate examples of operating modes of a keyless entry system.

In order to prevent such attacks, i.e. this type of unauthorized uses of a vehicle 10, in an entry system comprising a transponder unit 30 and a transmission unit 20, a motion sensor 31 is provided in the transponder unit 30. FIG. 3 shows an entry system of this type. The motion sensor is designed to detect movements of the transponder unit 30, and to generate one or more items of motion information from the detected movement of the transponder unit 30. The transponder unit 30 is also designed to transmit, in a first operating state, to the transmission unit 20 a reply 62 in response to a request 61. This reply 62 contains the motion information that was generated by the motion sensor 31. The transmission unit 20 is designed to evaluate the motion information and to decide on the basis of the motion information whether the vehicle 10 is meant to be activated. Said "activation" involves, for instance, unlocking the vehicle 10 and/or giving the vehicle 10 clearance to start.

The transponder unit 30 can be in portable form, for instance integrated in a vehicle key. The motion sensor 31 can be designed to detect any form of movement of the transponder unit 30 and to output corresponding motion information, which may contain one or more items of motion information. Such movements may comprise vibrations, jolts, shakes, but also movements of the transponder unit 30 relative to the transmission unit 20. In the simplest case, the motion information may be an item of binary information that indicates solely whether or not the transponder unit is being moved. The motion information may also be more complex information, however, for instance a speed, an acceleration acting on the transponder unit 30, or the like. It is also possible that the motion sensor 31 determines position information about the position of the transponder unit 30, as an alternative to, or in addition to, the aforementioned motion information.

The at least one item of motion information generated by the motion sensor 31 can be stored in the transponder unit 30, wherein the motion information can remain stored for a certain time interval, and can be overwritten at the end of this time interval by new motion information.

The transmission unit 20 can determine from the motion information in which time intervals and in what manner the transponder unit 30 has been moved. The transmission unit 20 can make the decision over whether or not to activate the vehicle 10 on the basis of the motion information available within a predefined first time interval, for example.

If the transmission unit 20 infers from the motion information, for example, that the transponder unit 30 has not been moved within the first time interval prior to arrival of the request 61 at the transponder unit 30, then the transmission unit 20 decides not to activate the vehicle 10. If, however, the transponder unit 30 has been moved within the first time interval prior to the request 61 arriving at the transponder unit 30, then the transmission unit 20 may decide to activate the vehicle 10.

The transmission unit 20 can make the decision over whether or not to activate the vehicle 10 for example solely on the basis of the motion information. Optionally, the decision by the transmission unit 20 can be made also on the basis of the motion information in combination with at least one specified activation criterion. This at least one activation criterion may depend on the design and function of the vehicle 10, and may comprise, for example, the locking state of the vehicle 10, the operating state of the vehicle 10, a position of the transponder unit 30 relative to the transmission unit 20, or a signal strength from the transponder unit 30, which signal strength is measured by the transmission unit 20.

If it has decided to activate the vehicle 10, the transmission unit 20 can decide, for example, to unlock the vehicle 10 and/or to give the engine of the vehicle 10 clearance to start. Furthermore, also any other functions in and on the vehicle 10 can be enabled or activated by the transmission unit 20 as part of the activation of the vehicle 10.

Figure 4:
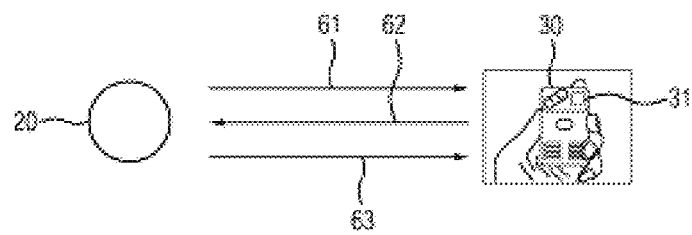

FIG. 4 illustrates a modification of the method shown in FIG. 3. In this example, the transmission unit 20, after it has received the reply 62 from the transponder unit 30 in response to the request 61, sends an instruction 63 to the transponder unit 30. This instruction causes the transponder unit 30 to remain, until further notice, for instance for a certain time interval or until a further instruction, in the first operating state, in which the transponder unit 30 returns its motion information in response to requests from the transmission unit 20.

Figure 5:
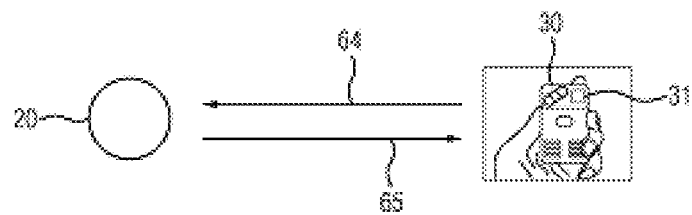

FIG. 5 shows another modification of the method. In this case, the transponder unit 30 is designed to transmit automatically and according to need, a notification 64 (spontaneous request message) to the transmission unit 20. In this notification 64, the transponder unit 30 can transmit, for example, that it will transition into a second operating state within a predefined second time interval after transmission of the notification 64. The transponder unit 30 can transmit this notification 64 to the transmission unit 20 without a prior request 61 by the transmission unit. The transmission of the notification 64 can be event driven. Such an event may be, for instance, that the motion sensor 31 has not detected any movement of the transponder unit 30 for a predefined third time interval.

The predefined second time interval may be, for example, a time period that is long enough to send the notification to the transmission unit 20 and to allow the transmission unit 20 to check the notification and, if applicable, to send a reply to the transponder unit 30. For example, this second time interval lies between 1 second and 10 seconds, in particular between 4 seconds and 7 seconds. The third time interval equals, for example, between 1 second and 10 minutes, in particular between 1 minute and 3 minutes.

If, for the example shown with reference to FIG. 5, the transponder unit 30 transmits a notification 64 to the transmission unit 20, the transmission unit 20 checks on the basis of at least one specified state transition criterion whether the transponder unit 30 is allowed to switch into the second operating state. If the transmission unit 20 recognizes from the at least one state transition criterion that the transponder unit 30 is not meant to switch into the second operating state, then the transmission unit 20 can transmit to the transponder unit 30 in response to the notification 64 a corresponding instruction 65. This instruction 65 can then cause the transponder unit 30 to remain in the first operating state until further notice or until a further instruction is received. This instruction 65 can also cause the transponder unit 30 to remain in the first operating state within and beyond the predefined second time interval after transmission of the notification 64. If, on receiving the notification 64, the transmission unit 20 recognizes that a switch in the operating state of the transponder unit 30 is meant to be allowed, then the transmission unit can send a corresponding reply to the transponder unit. In a further example, the transmission unit 20 does not send any reply if the transponder unit is allowed to transition into the second operating state, and, at the end of the predefined second time interval, the transponder unit 30 switches into the second operating state even without an instruction 65 by the transmission unit 20. The at least one state transition criterion can take into account, for example, the locking state of the vehicle 10, the operating state of the vehicle 10, a position of the transponder unit 30 relative to the transmission unit 20, or a signal strength from the transponder unit 30, which signal strength is measured by the transmission unit 20.

By virtue of the transmission unit 20 checking the notification of the intended switch in operating state of the transponder unit 30, it is possible for the transmission unit 20 actively to prevent an unwanted switch of the transponder unit 30 into the second operating state. The decision over whether a switch in the operating state shall be allowed or prohibited can be made by the transmission unit 20 according to need. Unlike the transponder unit 30, which can decide only on the basis of the motion information, the transmission unit 20 can determine the state of the entry system additionally on the basis of the at least one state transition criterion, and consequently can also take account of the operating state of the entire entry system in making a decision over the switch into the second operating state of the transponder unit 30.

The first operating state of the transponder unit 30 can be an active operating state. For example, the transponder unit 30 can receive and send signals emitted by the transmission unit 20 only when it is in the activated state. The second operating state of the transponder unit 30 can be a passive operating state (idle state). In the passive operating state, the transponder unit 30 either cannot receive any signals or cannot emit any signals, or can do neither, with the result that no communication can take place with the transmission unit 20.

In the passive operating state, all the functions, or just some of the functions, of the transponder unit 30 are inactive. For example, both the function of unlocking and starting (PASE) and a remote keyless entry function can be deactivated. It is also possible, however, for only the PASE function to be deactivated while the other functions still remain active. Thus while the transponder unit 30 is in the passive operating state, it is possible, for example, to prevent certain signals being received and/or sent. Meanwhile, the receiving of other signals can continue to be allowed. In particular, those functions that prevent unauthorized unlocking or starting of the vehicle 10 can continue to be active.

The transponder unit 30 can switch automatically from the second operating state into the first operating state. This can be done, for instance, by the transponder unit 30 being moved, the motion sensor 31 detecting a movement, and the transponder unit 30 thereupon switching from the second operating state into the first operating state.

The switch in the operating state by the transponder unit 30 into the second operating state can be done in order to reduce the power consumption of the transponder unit 30 during times in which the entry system is not needed. Nonetheless, the switch in the operating state of the transponder unit 30 is not meant to impair certain use-cases of the entry system during this time. Hence the transmission unit 20 prevents the transponder unit 30 switching into the second operating state when, for instance, the transponder unit 30 is located in the vehicle passenger compartment. Detecting whether the transponder unit is located in the vehicle passenger compartment is performed, for example, on the basis of the at least one state transition criterion, which is evaluated before the transmission unit allows the transponder unit to transition into the second operating state. This at least one state transition criterion is in this case, for example, the receive strength of a signal received by the transmission unit from the transponder unit.

In the entry system according to an aspect of the invention, the transponder unit 30 and also the transmission unit 20 can be designed to transmit signals between transmission unit 20 and transponder unit 30 in encrypted or at least signed form. For example, the request 61, the instructions 63, 65 and the notification 64 can be transmitted in encrypted or at least signed form from the transmission unit 20 to the transponder unit 30 and conversely. The encryption and/or signing allows a further improvement in the security of the entry system against attacks by third parties because it is no longer possible for third parties to read or tamper with the information transmitted by the signals.

In the transmission of notifications from the transponder unit 30 to the transmission unit 20, security information can additionally be transmitted that allows the transmission unit to identify the transponder unit 30. The transmission unit 20 can recognize from this information that it is an authorized transponder unit 30.

Figure 6:
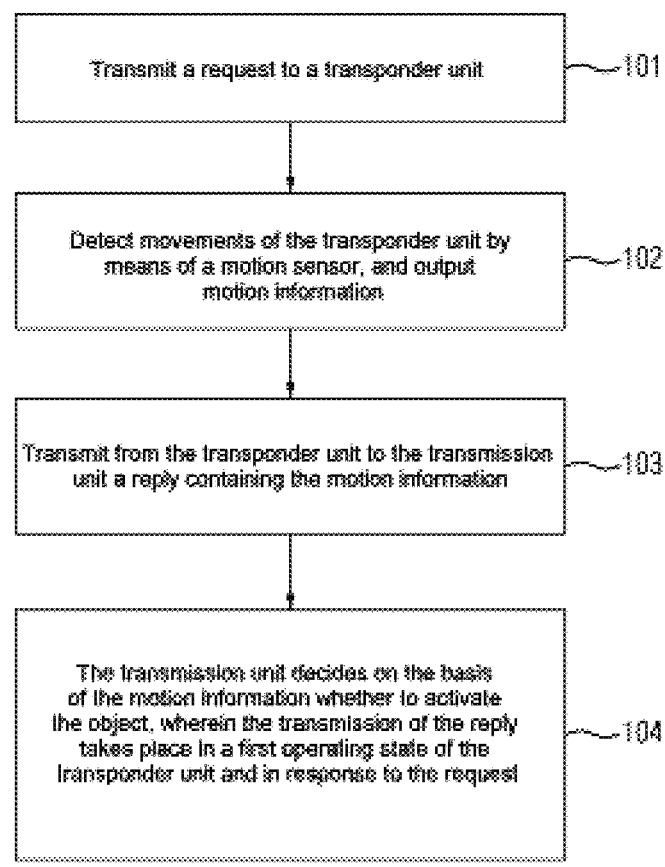
FIG. 6 shows a flowchart of a method for operating an entry system according to one embodiment of the invention.

FIG. 6 uses a flowchart to show schematically the method described above for operating an entry system. The method comprises transmitting the request 61 to the transponder unit 30 (step 101). The motion sensor 31 of the transponder unit 30 detects movements of the transponder unit 30 and generates motion information (step 102). The transponder unit 30 transmits to the transmission unit 20, in response to a request 61, a reply 62 containing the motion information (step 103). The transmission unit 20 decides on the basis of the motion information whether or not to activate the object 10 (step 104), wherein the transmission of the reply 62 takes place in a first operating state of the transponder unit 30.

The transponder unit 30 can be arranged in a portable electronic device such as, for instance, an electronic vehicle key, a smartphone, a tablet or a laptop. In these cases, the motion sensor 31 of the transponder unit 30 can be a motion sensor which outputs motion information that is used by the portable electronic device also for additional purposes. In one example, the portable electronic device and the transponder unit 30 share use of a motion sensor 31 and the motion information output by said motion sensor. Alternatively, the portable electronic device can also function as the transponder unit 30.

If the transponder unit 30 is arranged in a portable electronic device, or the portable electronic device functions as the transponder unit 30, then also additional information besides the motion information can be transmitted to the transmission unit 20. This information can be processed by the transmission unit 20 as activation criteria or as state transition criteria, and can be used jointly with the motion information to decide whether or not to activate the vehicle 10 and/or whether the transponder unit 30 is allowed to switch into a second operating state. In these cases, the communication between transponder unit 30 and transmission unit 20 can take place via a Bluetooth connection.

The additional information may be, for instance, information about a connection to a known WLAN network (Wireless Local Area network), information about an existing Bluetooth connection to the vehicle 10 or to another electronic device, and information about dates and tasks that are stored in a calendar on the user's electronic device.

An aspect of the invention has been described using the example of a vehicle 10. An aspect of the invention may, however, be used not only in vehicles 10 but in any kind of object (for example front doors, garage doors, etc.) that are able to be locked or unlocked by way of a transponder unit 30. A vehicle 10 may be a passenger vehicle, for example. A vehicle 10 may, however, also be a truck, bus, or the like, for example.

LIST OF REFERENCE SIGNS 10 vehicle
20 transmission unit
30 transponder unit
31 motion sensor
40 first device
50 second device
61 request
62 reply
63 instruction
64 notification
65 instruction

The invention claimed is:

1. An entry system comprising:
a transponder unit and
a transmission unit which is arranged in an object, wherein
the transmission unit is designed to transmit a request to the transponder unit;
the transponder unit comprises a motion sensor which is designed to detect a movement of the transponder unit and to generate motion information;
the transponder unit is designed to transmit, in a first operating state, to the transmission unit, in response to the request, a reply containing the motion information, and wherein
the transmission unit is designed to decide on the basis of the motion information whether to activate the object, wherein the transponder unit is also designed to transmit to the transmission unit a notification that the transponder unit will transition into a second operating state within a predefined second time interval after transmission of the notification, the second operating state being a state in which one or more components of the transponder unit are disabled.

2. The entry system as claimed in claim 1, in which the transmission unit is also designed to activate the object if the transmission unit recognizes from the motion information that the transponder unit has been moved within a predefined first time interval prior to transmission of the request.

3. The entry system as claimed in claim 1, in which the transmission unit is also designed to decide on the basis of at least one specified state transition criterion, after receiving the notification, whether to transmit to the transponder unit an instruction that causes the transponder unit to remain in the first operating state within and beyond the predefined second time interval after transmission of the notification.

4. The entry system as claimed in claim 1, in which activating the object comprises at least one of the following activities:
unlocking the object;
locking the object;
giving the object clearance to start; and
switching on the object.

5. The entry system as claimed in claim 1, in which the transmission unit and the transponder unit are additionally designed to transfer the request, the reply, the notification and the instruction in signed or encrypted form.

6. The entry system as claimed in claim 1, in which the transmission unit is also designed to decide on the basis of the motion information and at least one specified activation criterion whether to activate the object.

7. The entry system as claimed in claim 6, in which the at least one specified activation criterion is selected from a group consisting of:
a locking state of the object;
an operating state of the object; and
a position of the transponder unit relative to the object.

8. The entry system as claimed in claim 1, in which the transponder unit is arranged in one of the following portable devices:
a vehicle key;
a smartphone;
a tablet; and
a laptop.

9. A method which comprises:
transmitting a request from a transmission unit to a transponder unit, wherein the transmission unit is arranged in an object;
detecting movements of the transponder unit by means of a motion sensor and generating motion information;
transmitting from the transponder unit to the transmission unit a reply containing the motion information; and
the transmission unit deciding on the basis of the motion information whether to activate the object, wherein
the transmission of the reply takes place in a first operating state of the transponder unit and in response to the request,
wherein the transponder unit is also designed to transmit to the transmission unit a notification that the transponder unit will transition into a second operating state within a predefined second time interval after transmission of the notification, the second operating state being a state in which one or more components of the transponder unit are disabled.

10. A vehicle comprising an entry system, wherein the vehicle comprises a transmission unit which is arranged in the vehicle, and a transponder unit, which is arranged in a portable device, wherein
the transmission unit is designed to transmit a request to the transponder unit;
the transponder unit comprises a motion sensor which is designed to detect a movement of the transponder unit and to generate motion information;
the transponder unit is designed to transmit, in a first operating state, to the transmission unit, in response to the request, a reply containing the motion information, and wherein
the transmission unit is designed to decide on the basis of the motion information whether to activate the vehicle,
wherein the transponder unit is also designed to transmit to the transmission unit a notification that the transponder unit will transition into a second operating state within a predefined second time interval after transmission of the notification, the second operating state being a state in which one or more components of the transponder unit are disabled.

* * * * *